though the cleaning air could be taken directly from the impeller stream. A passage 19 provided by a hollow member 21 may be employed to carry dirt away from the portion of the filter element 44 opposite the member 56. Thus, the dust and other dirt collected on the outside of the rotating filter element 44 when air is drawn by the impeller 26 through the filter element 44 through the passages 32 and into the passage 18 leading to the combustion air storage chamber is continuously blown off at the point opposite the element 56 and carried away through passage 19.

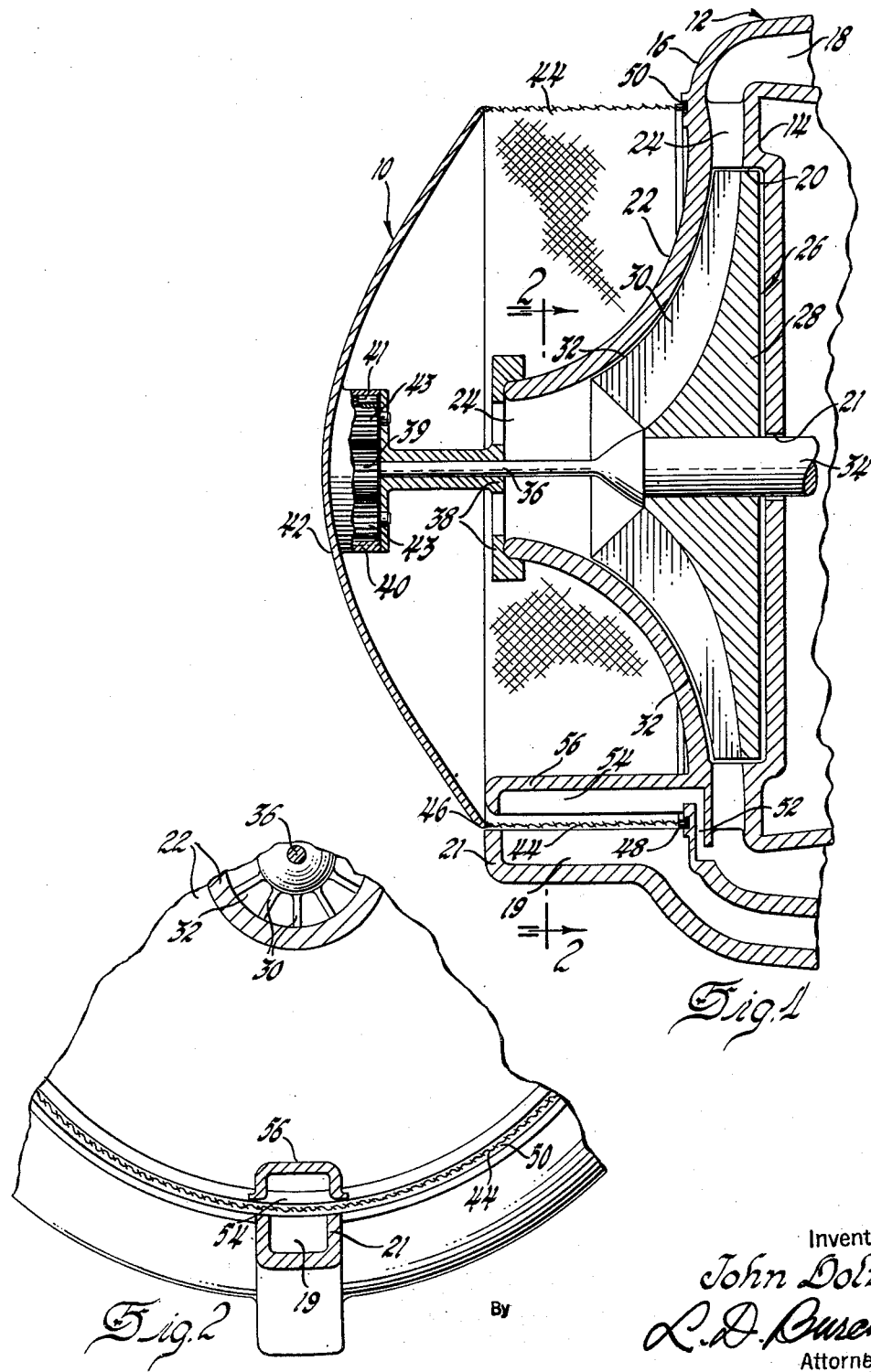

United States Patent Office 2,823,656
Patented Feb. 18, 1958

2,823,656

AIR FILTER

John Dolza, Davisburg, Mich., assignor to General Motors Corporation, Detroit, Mich., a corporation of Delaware Application September 27, 1954, Serial No. 458,437

7 Claims. (Cl. 123—119)

This invention relates to air cleaners for internal combustion engines and like devices, and more particularly to a self-cleaning air filter forming an integral part of the crankcase or frame of such an engine.

High displacement internal combustion engines require a relatively large quantity of very clean combustion air for the safe and efficient operation thereof. Though a variety of devices have been provided for supplying large quantities of clean air to such engines, there is still a need for better and more efficient air cleaners. Presently used air cleaners either do not supply the required volume of air without excessive restriction or the filter element must be too frequently replaced or cleaned if the engine parts are to be properly protected. Such frequent replacement or repair is often impossible, as in the case of military or other equipment normally operated in remote places where replacement parts are not available or conditions are otherwise unsuitable for such maintenance. Self-cleaning air cleaners have been devised and employed in the past, but such devices have not functioned as efficiently as claimed.

It is now proposed to provide an air cleaner device for high displacement internal combustion engines, especially of the radial type having a double-walled type crankcase, in which the supporting parts of the air cleaner are in part integral with the walls of the crankcase of the engine, preferably at the front end thereof. Since the air cleaner is disposed at and formed integral with the front end of the crankcase, it may be of a size and structure permitting greater capacity than the usual side or top mounted air cleaner, both in respect to the impeller or air driving means and the filtering element. In a double-walled crankcase type of engine with which the present air cleaner is shown for purposes of illustration only, clean air may be stored in a combustion air storage chamber between the spaced walls for use in the combustion chamber. Air under pressure from the combustion air impeller may be employed to provide a jet of air for continuously cleaning the filtering element. Because the proposed air cleaner is physically larger and of a construction adapting itself to greater efficiency, the cleaner may operate for longer periods without the necessity of replacing or repairing the filter element thereof.

In the drawings:

Figure 1 is a cross-sectional view of an air cleaner embodying the invention.

Figure 2 is a cross-sectional view taken in the plane of line 2—2 of Figure 1.

Figure 3:
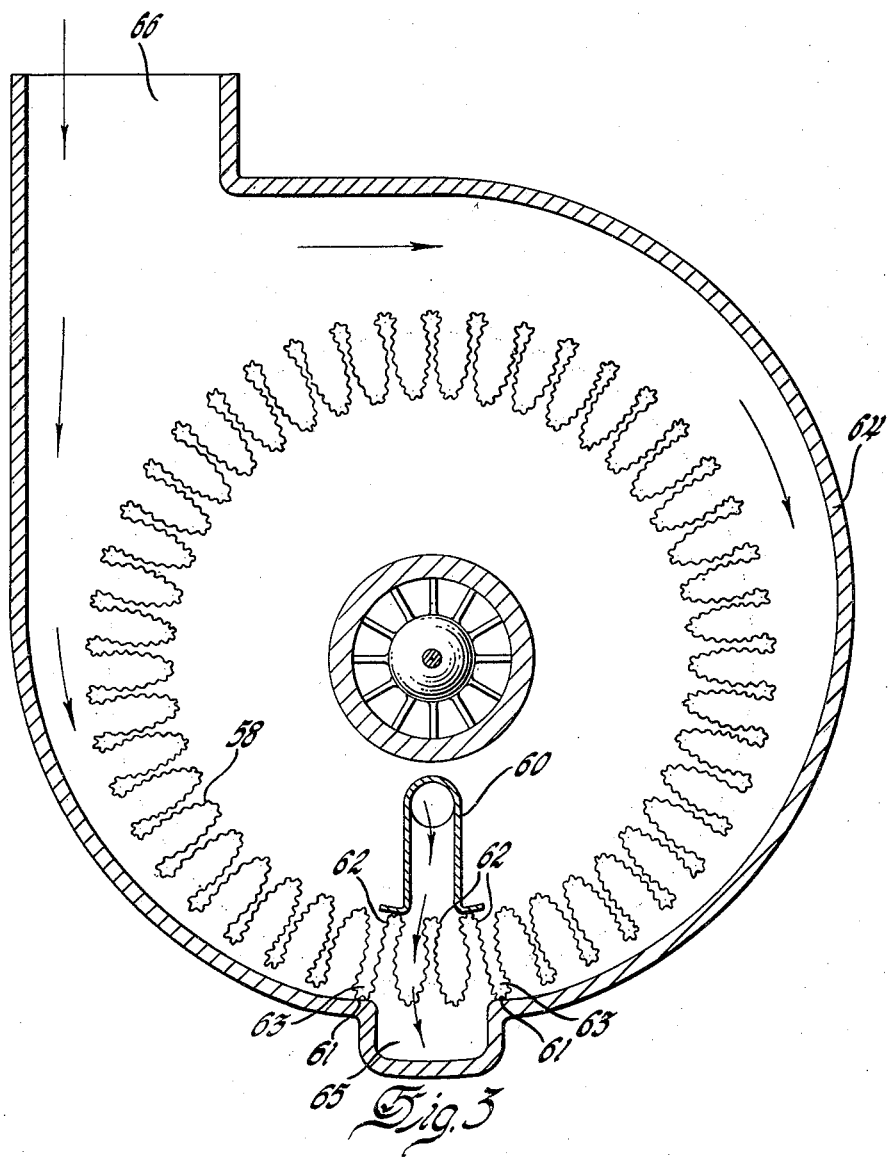
Figure 3 is a cross-sectional view similar to Figure 2 and of the same air cleaner as that shown by Figure 1, but illustrating the use of a modified form of filter element and an enclosure for the entire filter element.

Referring to the drawings in greater detail, an air cleaner 10 embodying the invention may be provided at the front end of a crankcase 12 having an inner wall 14 and an outer wall 16, with a passage 18 leading to a combustion air storage chamber provided by the space between the walls 14 and 16. The inner wall 14 extends across the front of the crankcase in a direction perpendicular to the axis thereof and has provided therein a circular recess 20 for receiving the air impeller 26. The outer wall 16 may be formed to taper inwardly and outwardly or forwardly to provide a conical cover 22 having a smaller opening 24 at the front end thereof in axial alignment with the circular recess 20 and the opening or journal 21. Air is drawn into the cleaner by an impeller 26 suitably driven by the engine and having a solid rear portion 28 disposed in the recess 20 of said inner wall 14 and also having vanes 30 which may determine the shape of the conical cover 22. Together with the cover 22, impeller 26 forms air passages 32 leading from the open end 24 of the conical cover 22, between the impeller vanes 30 and the cover 22 and into the passage 18 leading to the combustion air storage chamber. The impeller shaft 34 may be extended forwardly of the impeller 26 to provide a shaft 36 passing through a spoked support member 38 and into a gear box 40 attached axially of the cleaner cover 42. The gear box 40 may contain any suitable means such as a common reduction gear assembly for driving the cover 42 at a speed reduced from that of the impeller 26. Such a reduction gear assembly may, for example, comprise a spur gear 39 fixed to the end of shaft 36, a ring gear 41 on the inside surface of the gear box 40, and idler gears 43 rotatably mounted on stationary member 38. Alternatively, the cover 42 may be rotated constantly or intermittently by separate driving means such as an electric motor and a peripheral ring gear at the outside of cover 42. Filter element 44 is secured to the outer peripheral edge 46 of the cover 42 so that the filter element 44 may rotate with the cover 42 while the rear edge of the filter element is provided with a bead or seal 48 which is supported in and guided by the annular groove 50 in the outer wall 16 of the crankcase 12 surrounding said conical cover 22. Passage 52 is provided to permit a portion of the air from the impeller to be discharged through the longitudinal opening 54 in the hollow member 56, which may be provided integral with the outer wall 16 of the crankcase 12, for providing a jet of cleaning air adjacent and across the inside of the filter element 44. The passage 52 preferably communicates with a point in the passage 18 nearest the impeller 26 where static air pressure exists in order to provide a constant non-fluctuating jet of cleaning air, al- Figure 3 illustrates a modification of the air cleaner shown by Figures 1 and 2. In this form of the invention, the filtering element 58 is pleated to provide more filtering area and to incorporate a mechanical loosening action for the dust and dirt collected at the outside of the filtering element. The member 60, similar to member 56 in the form of the invention shown in Figures 1 and 2, may extend across three of the folds 62, for example, at the inner side of the filtering element 58 and the jet of air taken from the passage 18 tends to expand the pleats in the filtering element to mechanically dislodge any crust of dirt formed at the outside thereof, thus making it easier for the air to remove the dust. Figure 3 also illustrates a cover 64 completely enclosing at least the filter element with a single passage 66 leading therefrom. Such a cover may be used where the engine is to be adapted for underwater operation, as by a snorkel tube arrangement. Cover 64 may be formed to provide shoulders 61 to provide a seal with the outer falls 63 of the pleated filter element 58 and to provide a passage 65 to carry away dirt removed from the filter element 58.

From the foregoing specification and drawings it can be seen that there has been provided an air cleaner integral with the front end of an engine crankcase, enabling the provision on the engine of an air cleaner of larger dimensions yet utilizing the space in the engine compartment more conveniently or efficiently than would top or side mounted structures of the same size. With the larger structure, the air filter is capable of providing more clean air for high displacement engines with less frequent need for changing the filter element thereof and otherwise maintaining the cleaner.

What is claimed is:

1. An air filter for engines and like devices comprising means for mounting said filter on said engine, said mounting means including portions of the front end of the crankcase of said engine, air driving means, said means being driven by the crankshaft of said engine, air passages for said driven air, said passages being formed in part by extensions of the walls of said crankcase, and air filtering means, said filtering means being driven by means associated with said air driving means and being supported and guided by means forming a part of said front end of said crankcase.

2. An air filter such as that defined by claim 1 and being further characterized by means for continuously removing dirt accumulated on the outside of said filtering means, said dirt removing means including a member adapted to direct an air jet across said filtering means at the inside thereof and a member providing a passage at the outside of said filtering means opposite said air jet to carry away dirt removed by said jet.

3. An air filter for an internal combustion engine or a like device, said filter being disposed substantially in axial alignment with the frame of said engine at the front end thereof and having supporting and other elements thereof formed as extensions of parts of the front end of said frame, said supporting and other elements thereof including air driving means and annular air passages for said filter, and the filter element of said air filter having self-cleaning means associated therewith, said self-cleaning means including a jet of air directed against the inside surface of the rotating cylindrical filter element and a passage opposite said jet for carrying dirt removed by said jet.

4. A filter such as that described by claim 3 and being further characterized by said filter element being pleated to provide a structure flexed by said air jet to mechanically loosen said dirt accumulated on the outside thereof.

5. An air filter for an internal combustion engine or a like device, said filter being disposed substantially in axial alignment with the frame of said engine and having supporting and other elements thereof formed as extensions of parts of the front end of said frame and said filter having a filter element therein with one edge thereof rotatably driven and another edge thereof guided by shoulders on said frame.

6. An air filter such as that defined by claim 5 and further characterized by said filter element being enclosed to adapt said engine for under water operation.

7. Air filtering means for use with an internal combustion engine having parts thereof formed to support and house parts of said air filtering means and which comprise, a filter element having air driving means disposed therein and each being rotatable by common drive means, and filter cleaning means including means disposed within said filter element for directing air exhausted by said air driving means back through said filter element and opposite the intake flow therethrough.

References Cited in the file of this patent

UNITED STATES PATENTS

| | | |
|---|---|---|
| 1,493,789 | Mullen | May 13, 1924 |
| 2,187,264 | Carlson | Jan. 16, 1940 |
| 2,364,877 | Smellie | Dec. 12, 1944 |
| 2,583,850 | Kauffman | Jan. 29, 1952 |
| 2,601,907 | Burrows et al. | July 1, 1952 |
| 2,699,764 | Kiekhaefer | Jan. 18, 1955 |